N. B. DOANE.
ROTARY INTERNAL COMBUSTION ENGINE.
APPLICATION FILED FEB. 7, 1917.
1,255,865.
Patented Feb. 12, 1918.
3 SHEETS—SHEET 1.
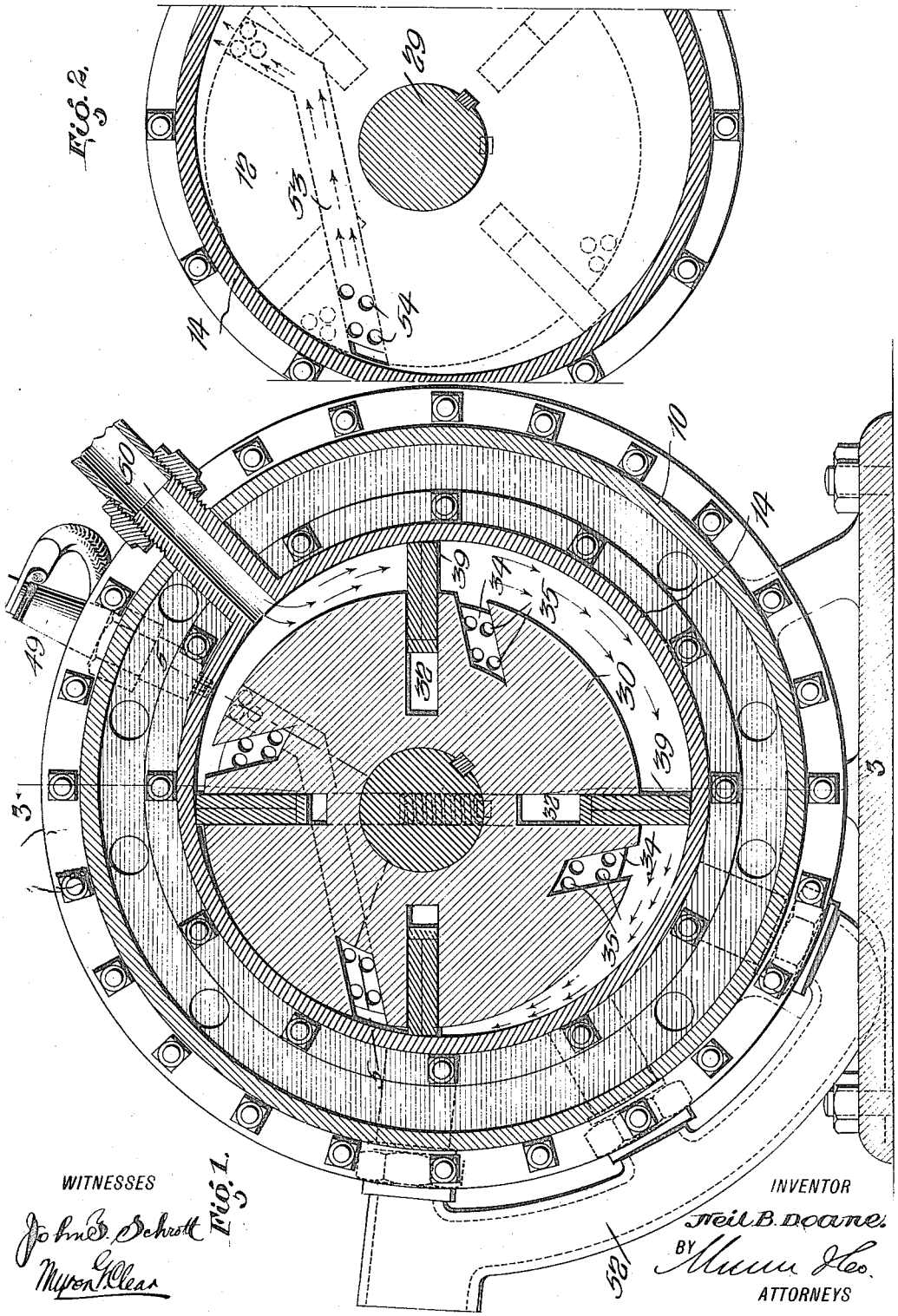

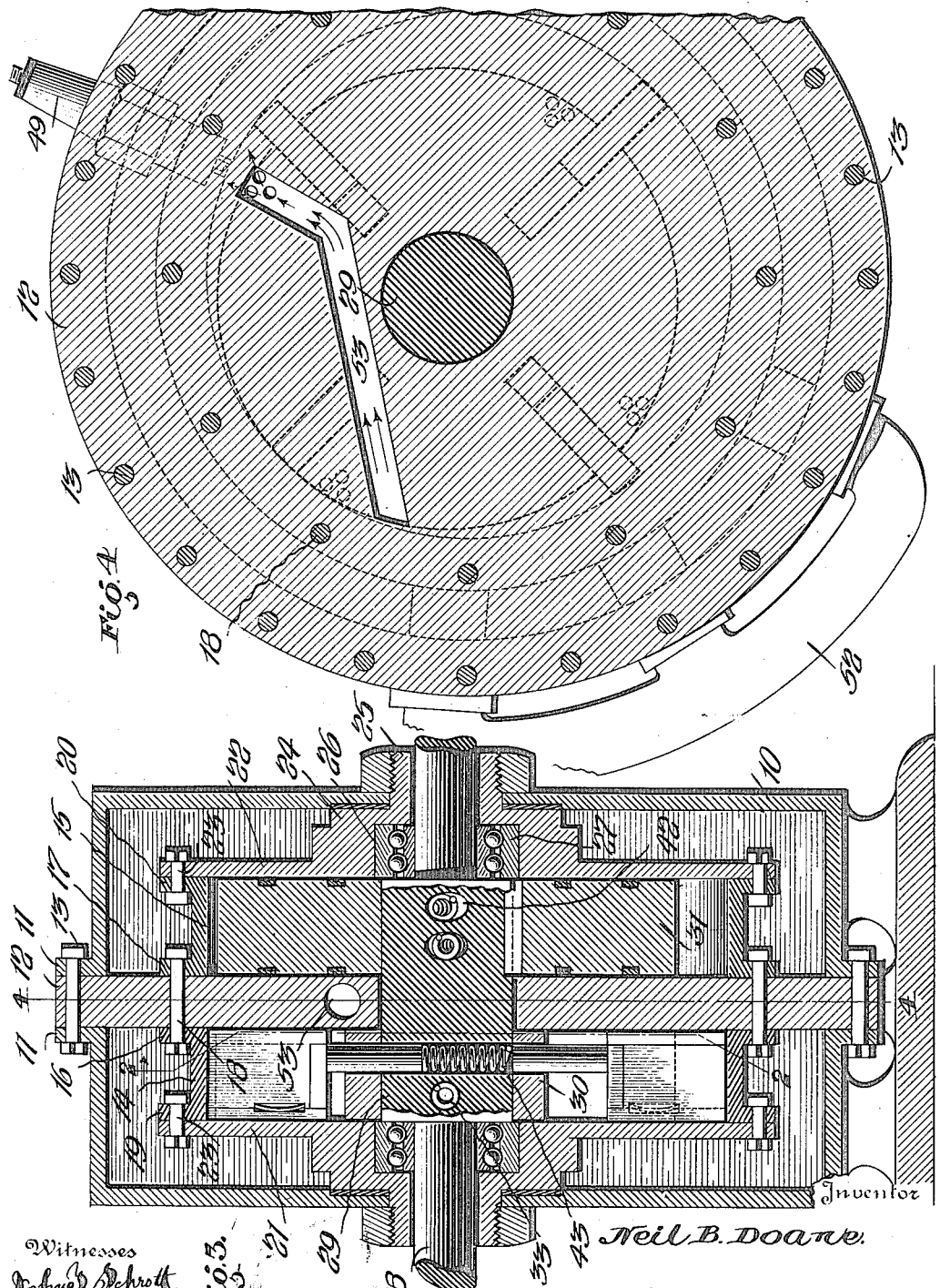

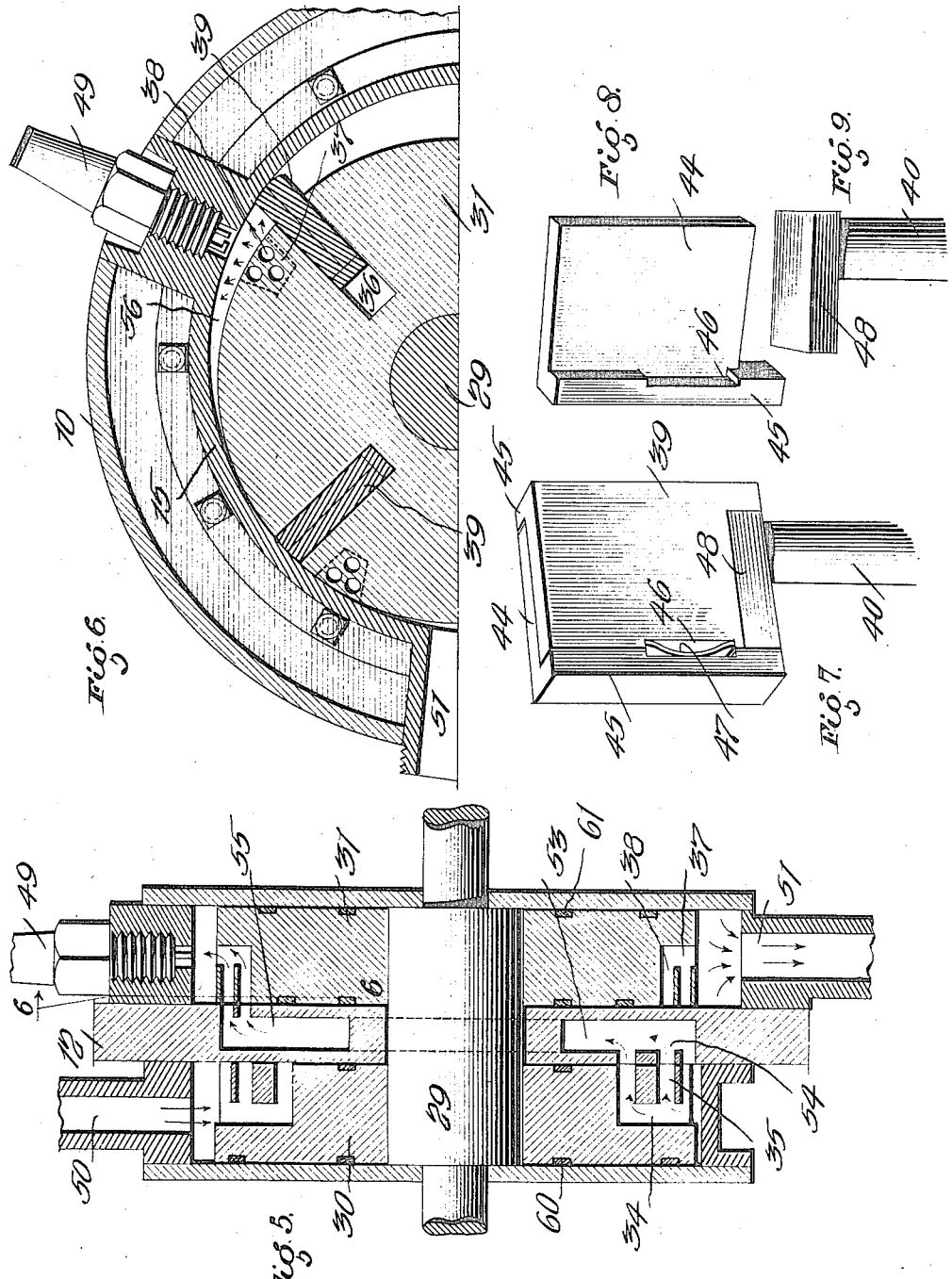

UNITED STATES PATENT OFFICE.

NEIL B. DOANE, OF DE RIDDER, LOUISIANA.

ROTARY INTERNAL-COMBUSTION ENGINE.

1,255,865.  Specification of Letters Patent.  Patented Feb. 12, 1918.

Application filed February 7, 1917. Serial No. 147,064.

*To all whom it may concern:*

Be it known that I, NEIL B. DOANE, a citizen of the United States, and a resident of De Ridder, in the parish of Beauregard and State of Louisiana, have invented a certain new and useful Improvement in Rotary Internal-Combustion Engines, of which the following is a specification.

My present invention relates generally to internal combustion engines, and more particularly to an internal combustion engine of the rotary type, my object being to provide a simple effective construction, doing away with the use of all valves, as in combustion engines of the reciprocating type, and a construction whereby continuous power movements may be had, applied to the power shaft in its rotary plane of movement, in the first instance, whereby to bring about uniform flexible power application.

Other objects residing for the most part in the details of construction of my improved engine, will be plain from the following description, wherein reference is made to the accompanying drawings forming a part of this specification, and in which—

Figure 1 is a vertical longitudinal section taken in a plane through the compression rotor;

Fig. 2 is a similar view through the cylinder, taken substantially on line 2—2 of Fig. 3;

Fig. 3 is a vertical cross section taken substantially on line 3—3 of Fig. 1;

Fig. 4 is a central vertical longitudinal section taken substantially on line 4—4 of Fig. 3;

Fig. 5 is a sectional view taken substantially on line 5—5 of Fig. 1;

Fig. 6 is a sectional view taken substantially on line 6—6 of Fig. 5;

Fig. 7 is a detail perspective view of one of the rotor blades removed;

Fig. 8 is a similar view of one of the heads of the blades, and

Fig. 9 is a similar view of one of the stems of the blade.

Referring now to these figures, and particularly to Figs. 1 and 3, my improvements are preferably mounted within a cylindrical water jacket 10, consisting of opposing side sections having flanges 11 around their inner ends, disposed against the outer side faces of a partition plate 12, extending through the said casing at its median point, and to which the side sections of the casing are connected by bolts 13 passing through the flanges 11 and through the partition plate 12 in a series adjacent and around the outer peripheral edge.

Within the casing 10, which, as above stated, forms a water jacket, and upon relatively opposite sides of the partition plate 12, are compression and explosion cylinders 14 and 15 respectively, having inner flanges 16 and 17 secured to the partition plate 12 by bolts 18, the said partition plate thus forming the inner wall of each of said cylinders.

The cylinders 14 and 15 are also provided with outer flanges 19 and 20, secured to their respective outer side plates 21 and 22, by bolts 23, the said side plates 21 and 22 having central bosses 24 and outwardly projecting hub portions 25, the former of which provide for inner cavities 26 supporting antifriction bearings 27.

The hub portions 25 of the cylinder side plates are eccentric thereto, and with respect to the casing 10, to receive portions of the power shaft 28, the intermediate enlarged portion 29 of which extends from the inner surface of the side plate 21 of cylinder 14 to the inner surface of the side plate 22 of cylinder 15, and continuously through an enlarged opening of the partition plate 12, the shaft 28 being mounted in the antifriction bearing 27.

The shaft 28 being thus eccentric to the cylinders 14 and 15, the compression and explosion rotors 30 and 31, secured to its enlarged portion 29 respectively within the cylinders 14 and 15, will thus be eccentric to the said cylinders, causing the said rotors to be positioned at one point contiguous to the inner surfaces of the cylinders, in order to form abutments, as clearly seen by reference to Fig. 1.

The compression rotor 30, as seen in Fig. 1, is provided with a plurality of radial slots 32, with bores 33, as seen in Fig. 3, extending through the central portion thereof, and through the enlarged portion 29 of the power shaft and connecting the inner ends of diametrically opposed slots 32, the compression rotor being further provided with a series of cavities 34, equal in number to the slots 32 and disposed one in advance of each of said slots, as seen by reference to Fig. 1, each cavity 34 communicating through the inner side face of the rotor and with the adjacent side face of the partition plate 12, through openings 35.

The explosion rotor 31 is likewise provided with a series of radial slots 36, as seen by reference to Fig. 6, and with cavities 37 equal in number to the slots 36, and disposed with each cavity in the rear of the respective slot 36, the several cavities 37 communicating through the inner side face of the rotor 31 and with the corresponding side face of the partition plate 12, through openings 38.

Radially slidable in each of the slots 32 and 36 of the rotors 30 and 31, is a blade 39 having a stem 40, the said stems projecting inwardly, with the inner ends of diametrically opposing blades in spaced relation within the openings 33 and 42 through the enlarged shaft portion 29 of the compression and explosion rotors respectively, the said inner ends of the stems having between them compression springs 43 as best seen in Fig. 3, the functions of which are to elastically hold the blades in spaced apart relation and tend to maintain their outer ends in uniform sliding contact with the inner surfaces of the cylinders 14 and 15 at all times.

Each of the blades 39, as seen in Figs. 7, 8, and 9 consists of a pair of plates 44 of similar construction, and disposed in face to face relation, each plate having an angular flange 45 at one side opposing the adjacent edge of the other plate, the flanges 45 and opposing plate edges having recesses 46 registering with one another and coöperating to form grooves for the reception of springs 47 for shifting the plates laterally with respect to one another in order to hold their flanged side edges in uniform sliding engagement with the inner surfaces of the side walls 21 and 22 and the side faces of the partition plate 12, the plates 44 being cut away at their lower ends to receive the rectangular heads 48 at the outer ends of the stems 40 of the blades before mentioned.

Extending into the cylinder 15, at the upper portion thereof and at one side of its vertical axis, is a spark plug 49, and extending into the cylinder 14 at a somewhat similar point, is a fuel intake 50, the explosion cylinder 15 communicating at its lower portion upon the relatively opposite side of its vertical axis, with exhaust ports 51 in turn communicating with an exhaust manifold 52, as seen in Figs. 1, 4, and 6.

Referring now to Figs. 3, 4, and 5, it will be noted that the partition plate 12 is provided with a transverse channel 53, extending angularly therethrough above the shaft 28, with lateral openings 54 adjacent the lower end of the channel and communicating through one side face of the said partition plate adjacent the compression rotor 30, and with laterally extending openings 55 at the upper end of the channel, communicating through the relatively opposite face of the partition plate 12 adjacent the explosion rotor 31, both the openings 54 and 55 being in the circumferential plane of the side openings 35 and 38 of the compression and explosion rotors 30 and 31, to provide for registry of the latter therewith in the rotation of said rotor.

Thus, in operation as each of the blades 39 of the compression rotor 30, as seen in Fig. 1, pass the fuel intake 50, fuel will be sucked in in advance of the next succeeding blade, and during further rotation of the compression rotor, the charges thus sucked in will be compressed in advance of each blade 39 as the latter approaches the relatively opposite side of the cylinder 14 adjacent the abutment formed as before described, the charges being compressed within the cavities 34, so that upon registry of the openings 35 of each cavity with the lower opening 54 of the transfer channel 53, the compressed charge will pass through the channel and through its openings 55 and the openings 38 of one of the cavities 37 of the explosion rotor 31, immediately in the rear of one of its blades 39, when the rotor is in the position shown in Fig. 6, the spark plug being timed to ignite the charge so transformed to the explosion and within the combustion space 56, as seen in Fig. 6, to deliver the spark for ignition immediately after the respective openings 38 have passed out of registry with the openings 55 of the transfer channel.

Thus it is obvious that an explosion will occur, after the engine is once started, as each of the blades 39 of the explosion rotor pass the spark plug, thus producing four explosions to each complete revolution of the power shaft. This provides for a continuous uniform flexible power application, and the means employed in the construction of the engine as previously described, provide for the elimination of all valves and other complicated parts of like nature requiring almost constant attendance in reciprocating engines.

It is obvious that after explosions, the gases in the rear of each of the blades 39 of the explosion piston, expanding as they do for a considerable proportion of the rotation of the explosion rotor, will be liberated and exhausted through the exhaust port 51, to the manifold 52, as soon as the preceding blade passes the requisite distance beyond the vertical axis of the cylinder at the lower portion thereof.

It is further obvious that in use I may employ various additional well known devices in connection with my improved motor as thus described, for instance suitable lubricating means, or a system either of gravity or force feed lubrication, as well as well known circulating and cooling means for the water of the casing 10 forming the water jacket, and it is to be understood that I have refrained from illustration or minute description of such well known devices in connection with explosive engines, with the sole purpose in view of avoiding unnecessary complications and obscuring the real invention herein set forth.

I may also employ rings 60 and 61 at the relatively opposite sides of the rotors 30 and 31 respectively, as shown in Figs. 3 and 5, such rings being suitably disposed to engage the adjacent surfaces of the walls 12, 21, and 22 in order to prevent leakage of pressure and to hold the charges.

I claim:—

1. An engine of the character described, comprising a compression cylinder having intake means, an explosion cylinder having explosion and exhaust means, said cylinders being disposed in laterally spaced relation and open at their inner side, a partition plate secured between and connecting said cylinders, compression and explosion rotors respectively within and eccentric to said cylinders, and having radially movable blades, the compression rotor having a peripheral cavity in advance of each of its blades, and openings from each cavity through its inner face, the explosion cylinder having a peripheral cavity in the rear of each of its blades, and openings from each cavity through its inner face, and the partition plate having charge transferring means for periodical communication with the said openings and cavities of the compression and explosion rotors, during rotation of the latter.

2. An engine of the character described comprising a compression cylinder having intake means, an explosion cylinder having explosion and exhaust means, said cylinders being disposed in laterally spaced relation and open at their inner sides, a partition plate secured between and connecting said cylinders, compression and explosion rotors respectively within and eccentric to, said cylinders, and having radially movable blades, the compression rotor having a peripheral cavity in advance of each of its blades and openings from each cavity through its inner face, the explosion cylinder having a peripheral cavity in the rear of each of its blades, and openings from each cavity through its inner face, and the plate having a transferring channel and openings at the opposite ends of said channel leading respectively through opposite side faces thereof for registry with the openings of the compression and explosion rotors, during rotation of the latter.

3. An engine of the character described comprising a compression cylinder having intake means, an explosion cylinder having explosion and exhaust means, said cylinders being disposed in laterally spaced relation and open at their inner sides, a partition plate secured between and connecting said cylinders, compression and explosion rotors respectively within and eccentric to said cylinders, said compression and explosion rotors respectively having charge discharging and receiving openings communicating between their inner and peripheral faces, and radial spring actuated blades carried by said compression and explosion rotors, respectively in the rear, and in advance, of the discharging and receiving openings, the said partition plate having charge transferring means for periodical communication with the discharging openings of the compression rotor and the receiving openings of the explosion rotor.

4. An engine of the character described comprising a compression cylinder having intake means, an explosion cylinder having explosion and exhaust means, said cylinders being disposed in laterally spaced relation and open at their inner sides, a partition plate secured between and connecting said cylinders, compression and explosion rotors respectively within and eccentric to said cylinders, said compression and explosion rotors respectively having charge discharging and receiving openings communicating between their inner and peripheral faces, and radial spring actuated blades carried by said compression and explosion rotors respectively in the rear, and in advance, of the discharging and receiving openings, the partition plate having a transferring channel and openings at the opposite ends of said channel leading respectively through opposite side faces thereof for registry with the discharging openings of the compression rotor and the receiving openings of the explosion rotor.

5. In an engine of the character described, a slotted rotor having inner diametrical openings connecting the inner ends of its slots, blades slidable in the said slots, and stems mounted in the said inner diametrical openings, and springs between the opposing ends of the said stems, the blades having recesses at their inner ends, and said stems having heads at their outer ends removably interfitting the recesses of the blades.

NEIL B. DOANE.

Witnesses:
CHARLES W. DOANE,
JESSE C. MORER.